US006021605A

United States Patent [19]

Laux et al.

[11] Patent Number: 6,021,605

[45] Date of Patent: Feb. 8, 2000

[54] CONNECTOR ARM FOR POWER WINDOW ASSEMBLY

[75] Inventors: Wendy Kay Laux, Davisburg; Donald Szerlag, Canton, both of Mich.

[73] Assignee: General Motors Corporation, Detroit, Mich.

[21] Appl. No.: 09/066,743

[22] Filed: Apr. 24, 1998

[51] Int. Cl.[7] .................... E05F 11/00; F16D 1/00

[52] U.S. Cl. .................... 49/361; 49/121; 49/123; 49/375; 403/408.1

[58] Field of Search .................... 49/361, 121, 123, 49/375; 403/363, 230, 408.1; 384/22, 34; 312/138.1, 139.2, 304, 350, 333

[56] References Cited

U.S. PATENT DOCUMENTS

| | | |
|---|---|---|
| 1,634,954 | 7/1927 | McInerney . |
| 1,917,415 | 7/1933 | Woodruff . |
| 3,199,858 | 8/1965 | Koblensky . |
| 3,321,234 | 5/1967 | Harrell et al. . |
| 3,403,474 | 10/1968 | Spasoff . |
| 4,050,191 | 9/1977 | Azuma . |
| 4,119,341 | 10/1978 | Cook . |
| 4,177,605 | 12/1979 | Cherbourg et al. . |
| 4,322,914 | 4/1982 | McGaughey . |
| 4,330,960 | 5/1982 | Hasemann et al. . |
| 4,614,059 | 9/1986 | Trampe . |
| 4,635,398 | 1/1987 | Nakamura . |
| 4,671,013 | 6/1987 | Friese et al. . |
| 4,672,771 | 6/1987 | Lam et al. . |
| 4,674,231 | 6/1987 | Radek et al. . |
| 4,793,099 | 12/1988 | Friese et al. . |
| 4,839,990 | 6/1989 | Lam et al. . |
| 4,920,698 | 5/1990 | Friese et al. . |
| 4,991,347 | 2/1991 | Takimoto et al. . |
| 4,995,195 | 2/1991 | Olberding et al. . |
| 5,146,712 | 9/1992 | Hlavaty . |
| 5,531,046 | 7/1996 | Kollar et al. . |
| 5,669,181 | 9/1997 | Kollar et al. . |

*Primary Examiner*—Daniel P. Stodola
*Assistant Examiner*—Curtis A. Cohen
*Attorney, Agent, or Firm*—Kathryn A. Marra

[57] ABSTRACT

A power window assembly in a vehicle includes a slidable window pane mounted to the vehicle for movement in a first lateral direction to an open position and in a second lateral direction to a closed position. The assembly includes at least one mounting bracket securely attached to the window pane and having a pocket therein and a power drive mechanism for selectively moving the window pane between the closed position and the open position. Preferably, at least one connector arm is laterally coupled to the mounting bracket. The connector arm includes a locking plate and a body portion having a longitudinally extending body slot. The locking plate is longitudinally inserted into the longitudinal body slot to adjustably connect the window pane to the power drive mechanism.

11 Claims, 8 Drawing Sheets

CONNECTOR ARM FOR POWER WINDOW ASSEMBLY

This invention relates to a power sliding window assembly for a vehicle and more particularly to connector arms of the sliding window assembly which permit it to easily fit a variety of vehicles using the same components.

BACKGROUND OF THE INVENTION

It is known to have a rear window opening in a truck cab including a central opening defined between a pair of stationary window panes and to provide one or more laterally slidable window panes therebetween. The slidable window panes each typically are movable between a closed position closing the central opening and an open position opening the central opening. The slidable window panes each partially overlie one of the stationary window panes in the open position.

The slidable window panes may be moved between the open and closed positions either manually or by use a of a power drive mechanism. For example, it is known to have a reversible motor which drives a rack and pinion, cable, slotted tape, or some combination thereof for moving the slidable window panes between the open and closed positions. However, the power drive mechanisms of the prior art have numerous shortcomings which make the power window assembly cumbersome and expensive.

For example, the power drive mechanisms of the prior art are typically positioned within or integrally connected in some manner to a frame assembly which is mounted to the vehicle body and holds the window panes. Thus, the power drive mechanism must be purchased as a cumbersome and expensive power window assembly which includes the window panes and a specially modified frame integrally assembled with the power drive mechanism. In operation, these prior art power window assemblies typically push the window in one direction and pull the window in the other direction, thus limiting the smoothness of the window movement. In addition, extra parts are required such as a track or sheath in which the flexible cable or tape rides to prevent buckling during pushing movement of the window panes between the open and closed positions.

The prior art power window assemblies also have the shortcoming of having a rigid nonadjustable connection to the slidable window panes, thus being highly sensitive to dimensional variations. To avoid this shortcoming, the prior art power drive mechanism is integrally connected to the window assembly and sold as a replacement unit for the manually movable window assembly already provided with the vehicle. However, when the power window assembly is sold as a replacement unit to alleviate dimensional concerns between the power drive mechanism and the window assembly, then other dimensional fit concerns occur between the replacement unit and the truck body. Thus, prior art power window assemblies also have the disadvantage of high repair and replacement costs. Additionally, prior art power window assemblies have many components which are complex to assemble, require numerous fasteners, and are not easily adaptable to fit different size windows or to accommodate either one or two sliding window panes. Prior art assemblies also have the shortcoming of requiring different designs for the various curvatures or channel sweeps of the vehicle body surrounding the windows.

SUMMARY OF THE INVENTION

The present invention solves the shortcomings of the prior art by providing a power drive mechanism which has connector arms that permit both longitudinal and vertical adjustment of the power window mechanism for adaptation to numerous vehicle configurations using the same components. Furthermore, the power drive mechanism is independent and separate from the window assembly, including the window panes and the frame, such that the window assembly may be assembled directly to the vehicle body separate from the power drive mechanism. The present invention provides a power drive mechanism which may easily be added to any existing manual laterally sliding window assembly having one or more slidable panes.

Advantageously, the connector arm provides a vertically and longitudinally floating adjustable connection allowing pivoting, vertical, and longitudinal degrees of freedom between the power drive mechanism and the slidable window panes such that assembly of the power drive mechanism to the vehicle and attachment to the window panes is less sensitive to dimensional variations. Very advantageously, the invention is also less sensitive to the different forward to rearward longitudinal variations in the body sheet metal to window distances as well as differing window curvatures. This is accomplished by utilizing connector arms that can be easily added or removed from the power drive system without any other disassembly of the power drive mechanism, thus allowing for a single shipping package that can easily be modified to accommodate one or more sliding panes. Furthermore, the invention allows for much easier servicing of the power window drive mechanism by allowing easy disconnection of the drive mechanism from the window without having to disassemble the rest of power drive mechanism and without having to remove the power drive mechanism from the vehicle.

Also advantageously, the power drive mechanism of the present invention is characterized by easy slip-fitted attachment of the connector arm components for ease of assembly. The present invention advantageously enables a pull/pull system which pulls the slidable window panes between the open and closed positions to provide smooth sliding movement of the slidable window panes in a variety of vehicles.

These alternatives and advantages are accomplished by providing a power window assembly in a vehicle including a slidable window pane mounted to the vehicle for movement in a first lateral direction to an open position and in a second lateral direction to a closed position. The assembly includes at least one mounting bracket securely attached to the window pane and having a pocket therein and a power drive mechanism for selectively moving the window pane between the closed position and the open position. Preferably, at least one connector arm is laterally coupled to the mounting bracket. The connector arm includes a locking plate and a body portion having a longitudinally extending body slot. The locking plate is longitudinally inserted into the longitudinal body slot to adjustably connect the window pane to the power drive mechanism.

In accordance with other preferred aspects of the invention, the power drive mechanism includes a laterally extending channel member. The connector arm includes a body portion having a grooved portion for slidably receiving the channel member therein. The body portion includes a longitudinally extending body slot and a vertically extending body slot which intersect each other generally at right angles. A connector plate has a connector slot. The connector plate is adapted for slidable insertion through the vertically extending body slot such that the connector slot is vertically aligned with the longitudinally extending body slot. In addition, a locking plate is slidably insertable through the connector slot and the longitudinally extending body slot such that the locking plate is longitudinally adjustable relative to the body portion. Furthermore, the connector plate has a bottom edge for engagement with the channel member to hold the channel member in the grooved portion and the locking plate locks the connector plate in engagement with the channel member.

BRIEF DESCRIPTION OF THE DRAWINGS

An embodiment of the present invention is described, by way of example only, with reference to the accompanying drawings in which.

DESCRIPTION OF THE PREFERRED EMBODIMENT

Figure 1:
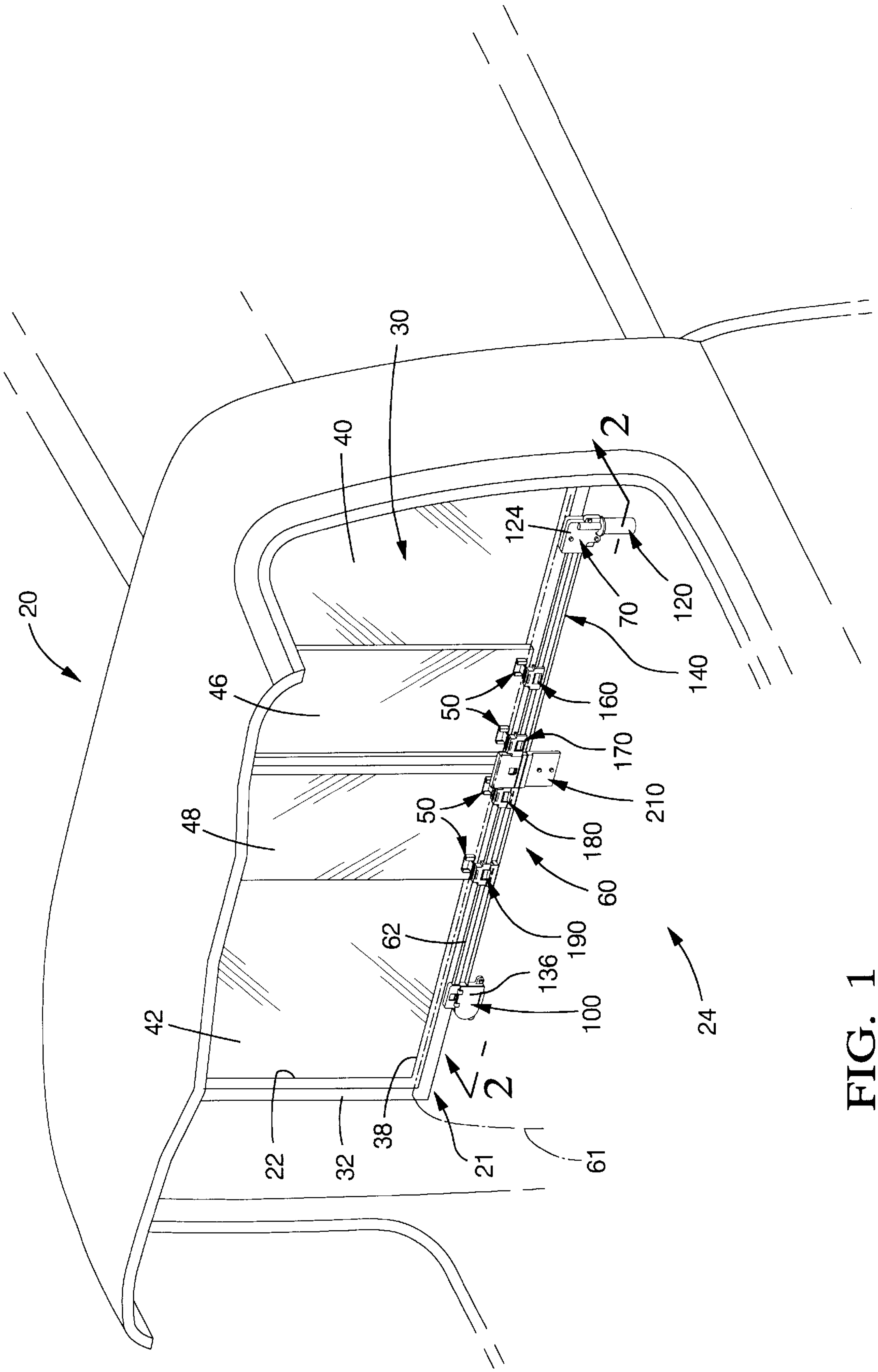
FIG. 1 is a frontal perspective view of a vehicle partially-broken-away and having a power window assembly including a window assembly and a power drive mechanism for moving the window assembly.

Referring to FIG. 1, a vehicle 20 includes a trapezoidal-shaped window opening 22 suitably formed by sheet metal vehicle structure 21. A power window assembly 24 includes a window assembly 30 and a power drive mechanism 60 adjustably connected to the window assembly 30 by connector arms with both vertical and longitudinal freedom for permitting differences in the dimensions, curvatures, and location of the sheet metal vehicle structure 21, as described in detail hereinafter.

Figure 2:
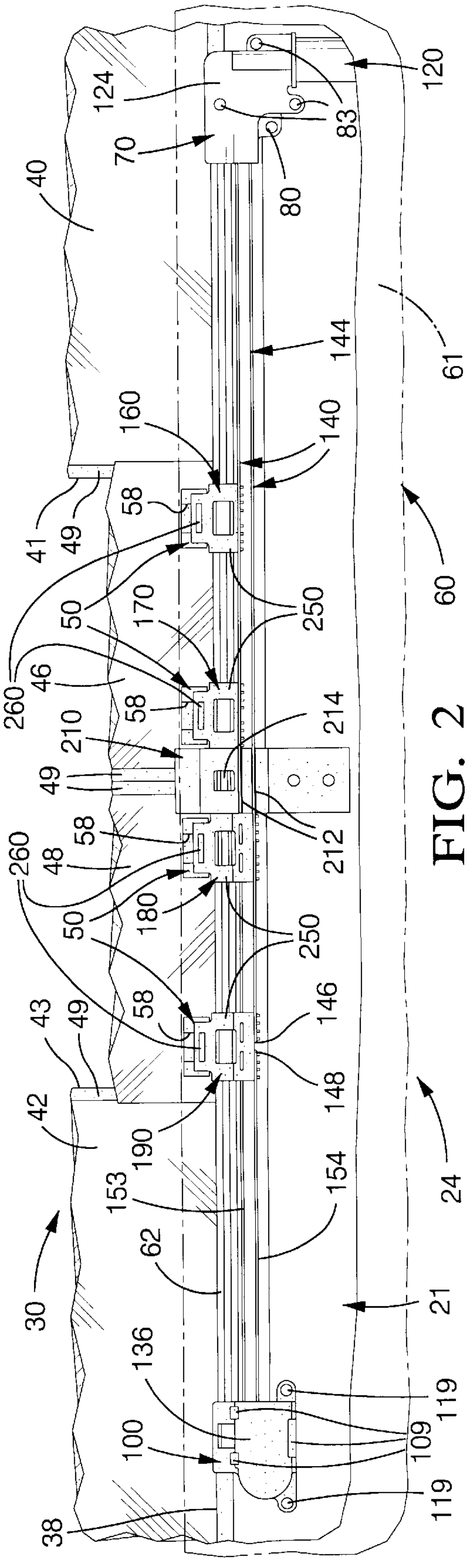
FIG. 2 is a view taken along line 2—2 of FIG. 1 and showing a front view of the power drive mechanism and the window assembly in the closed position and partially-broken-away.
Figure 3:
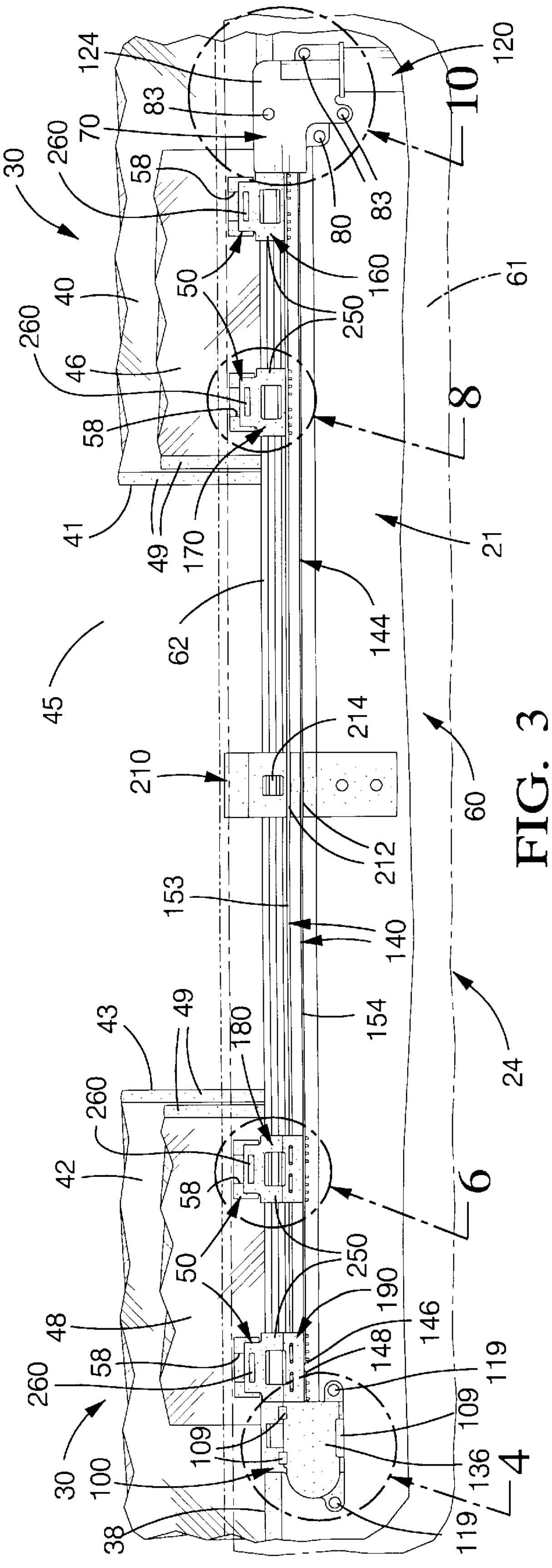
FIG. 3 is a view similar to FIG. 2, but showing the window assembly in the open position.
Figure 7:
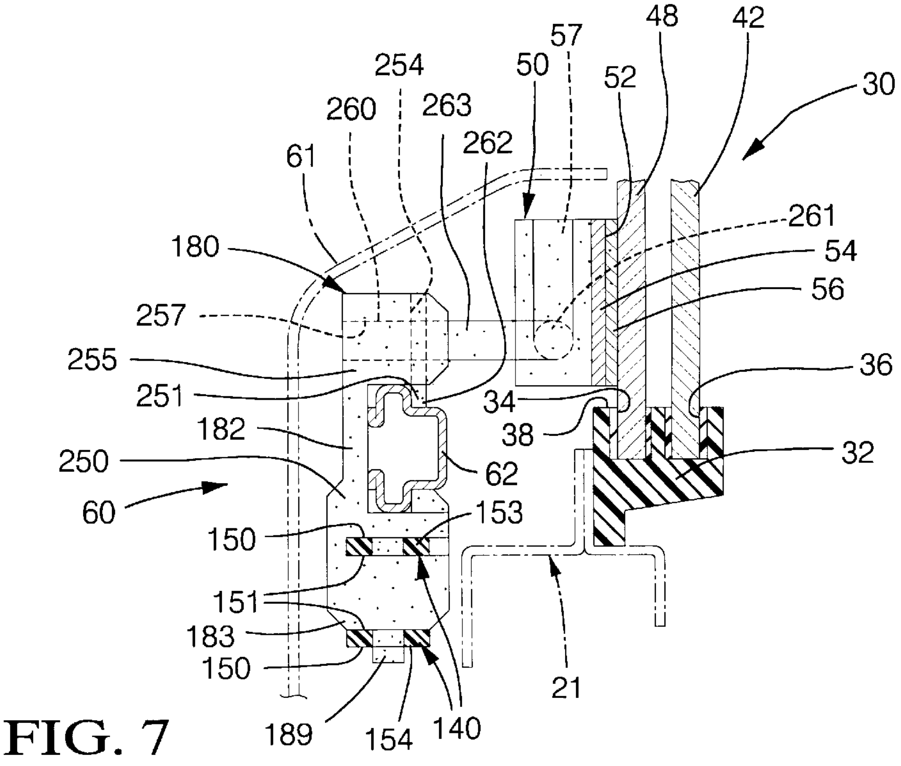
FIG. 7 is a view taken along line 7—7 of FIG. 6.
Figure 8:
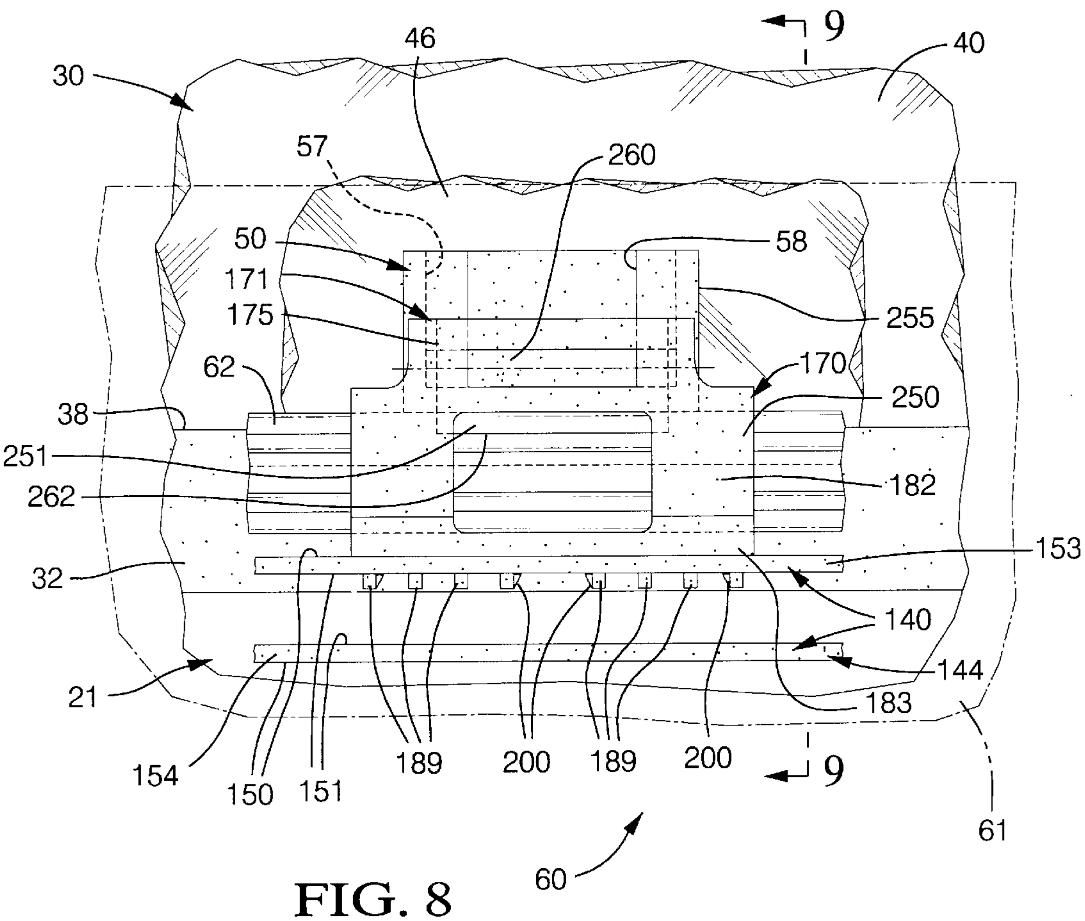
FIG. 8 is an enlargement of the encircled portion as indicated at 8 in FIG. 3 and showing an upper connector arm.
Figure 9:
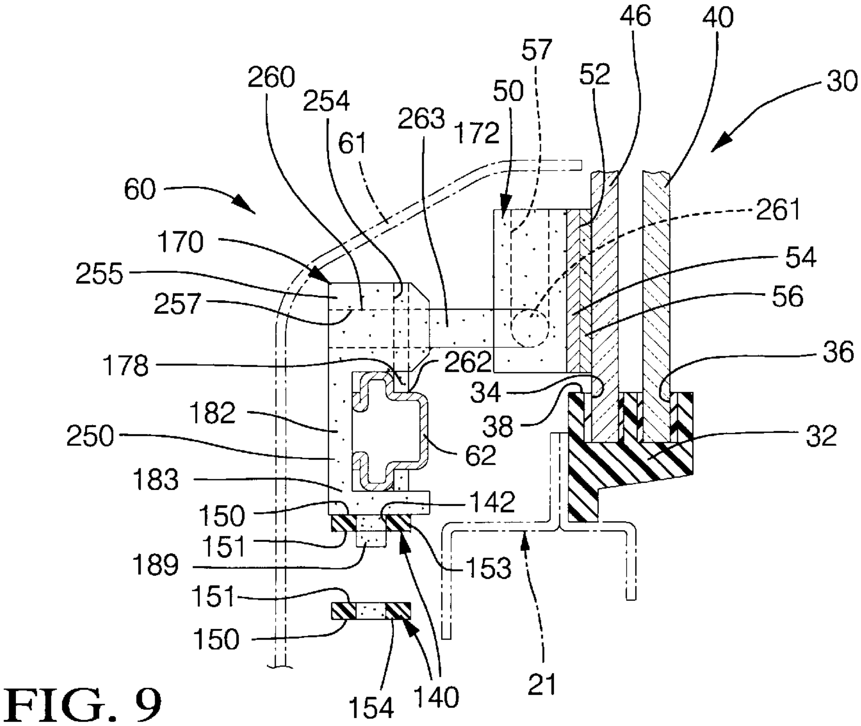
FIG. 9 is a view taken along line 9—9 of FIG. 8.

As best shown in FIGS. 7 and 9, the window assembly 30 includes a conventional frame 32 suitably mounted in the window opening 22 and having an inboard channel 34 and an outboard channel 36 formed on a lower edge 38 of the frame 32. Referring to FIG. 2, the window assembly 30 includes first and second spaced apart stationary window panes 40, 42 permanently mounted in the outboard channel 36 and at opposite sides of the window opening 22. Each of the stationary window panes 40, 42 includes a vertically extending free edge 41, 43 which does not engage the vehicle structure 21. As best shown in FIG. 3, the free edges 41, 43 of the stationary window panes 40, 42 along with an upper edge and the lower edge 38 of the window opening 22 cooperatively define a central window opening 45.

First and second slidable window panes 46, 48 are conventionally slidably mounted in the inboard channel 34 on the frame 32 for lateral movement between a closed position completely covering the central window opening 45 as shown in FIG. 2 and an open position in which the first and second slidable window panes 46, 48 each overlie at least a portion of the first and second stationary window panes 40, 42, respectively, as shown in FIG. 3. It will be appreciated that the window panes 40, 42, 46, 48 and the frame 32 are preferably the original equipment as provided with the vehicle 20 for manual operation. The stationary and slidable window panes 40, 42, 46, 48 may carry suitable seals 49 thereon for weather protection.

Referring to FIGS. 7 and 9, the window assembly 30 includes mounting brackets 50 each preferably molded from a polymeric material and including a rear face 52 preferably formed by a planar aluminum insert 54 integrally molded with the mounting bracket 50. As shown in FIGS. 2 and 3, two mounting brackets 50 are rigidly mounted on each of the first and second slidable window panes 46, 48 and located proximate opposite lateral sides of the slidable window panes 46, 48 and near the lower edge 38 of the window opening 22. The rear face 52 of the mounting brackets 50 are each preferably adhesively bonded to the slidable window panes 46, 48, such as by an adhesive material 56. Thus, the mounting brackets 50 are not moveable relative the slidable window panes 46, 48 when mounted thereto. The mounting brackets 50 each include an upwardly opening pocket 57 having a U-shaped forward opening 58, as shown in FIGS. 2 and 3. The mounting brackets 50 are coupled to the power drive mechanism 60 for lateral movement in unison therewith, as described further hereinafter.

Figure 5:
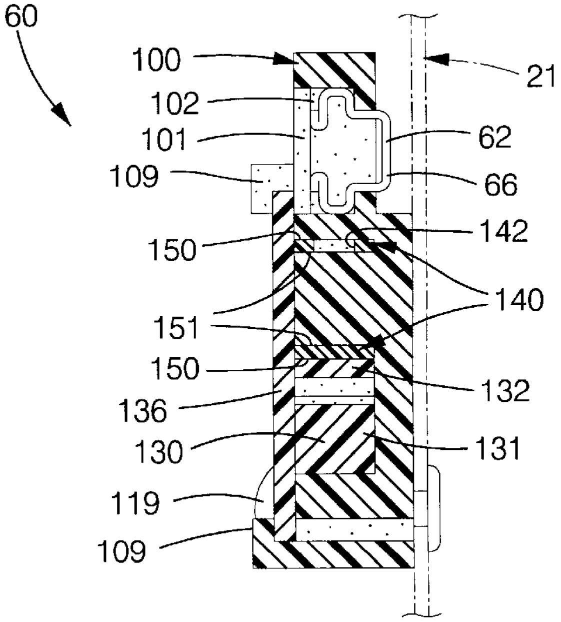
FIG. 5 is a sectional view taken along line 5—5 of FIG. 4.

The power drive mechanism 60 provides powered operation of the window assembly 30. The power drive mechanism 60 may advantageously be used with any existing standard vehicle window assembly 30 having slidable window panes 46, 48 with two mounting brackets 50 attached to each of the sliding window panes 46, 48. The power drive mechanism 60 is assembled completely independently and separately from the window assembly 30 and can later be easily attached thereto at the vehicle 20 assembly location. As best shown in FIG. 5 and also referring to FIGS. 1, 7, and 9, the power drive mechanism 60 is mounted to the vehicle structure 21 at a location beneath and longitudinally offset in a forward direction from the window assembly 30 including the window frame 32. It will be appreciated that this offset is different for different vehicles. In addition, it will be appreciated that each individual vehicle 20 may have a curvature to the window assembly 30 or the vehicle structure 21 such that the distance between the power drive mechanism 60 and the window assembly 30 varies along the length of the power drive mechanism 60. In addition, each vehicle 20 will have dimensional variations in the amount of offset. Advantageously, the power drive mechanism 60 is adjustably connected to the window assembly 30 for use in a variety of vehicles having different offsets, curvatures and dimensional tolerances, as described further hereinafter.

Referring to FIGS. 1–4 and 10, the power drive mechanism 60 includes the component parts of a channel member 62 extending between first and second housing members, 70, 100, a first gear 90 rotatably supported on the first housing member 70 and driven by an electric motor 120, a length of tape 140 having a plurality of slots 142 therein and formed into a loop 144 and coupling the first gear 90 to a second gear 110 supported in the second housing member 100, and floating connector arms generally designated as 160, 170, 180, 190 for adjustably connecting and laterally coupling the slotted tape 140 of the power drive mechanism 60 to the mounting brackets 50 of the window assembly 30. The power drive mechanism 60, with the exception of the connector arms 160, 170, 180, 190 is similar to that disclosed in U.S. Pat. Nos. 5,531,046 issued Jul. 2, 1996 and 5,669,181 issued Sep. 23, 1997 and assigned to the same assignee of this invention which are hereby incorporated by reference.

Figure 4:
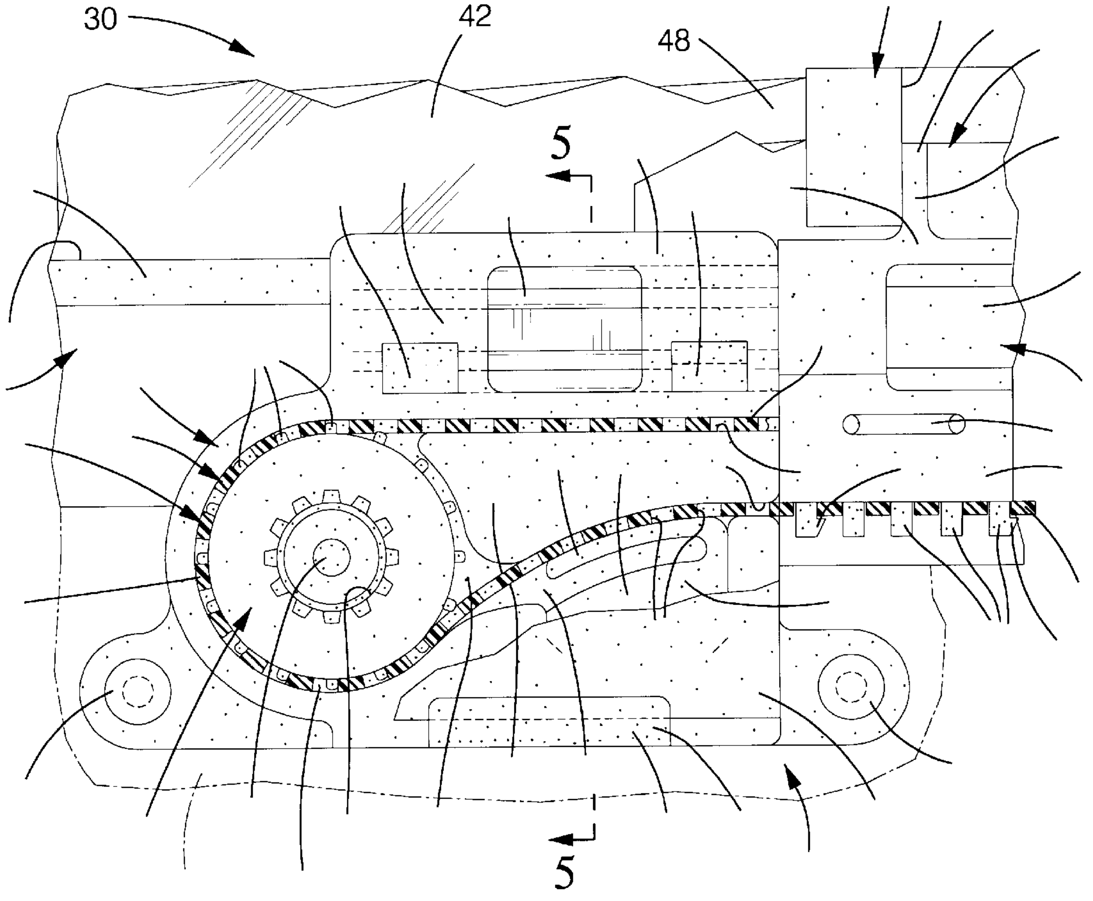
FIG. 4 is an enlargement of the encircled portion as indicated at 4 in FIG. 3 and showing a second housing member and a partially broken-away housing cover.
Figure 10:
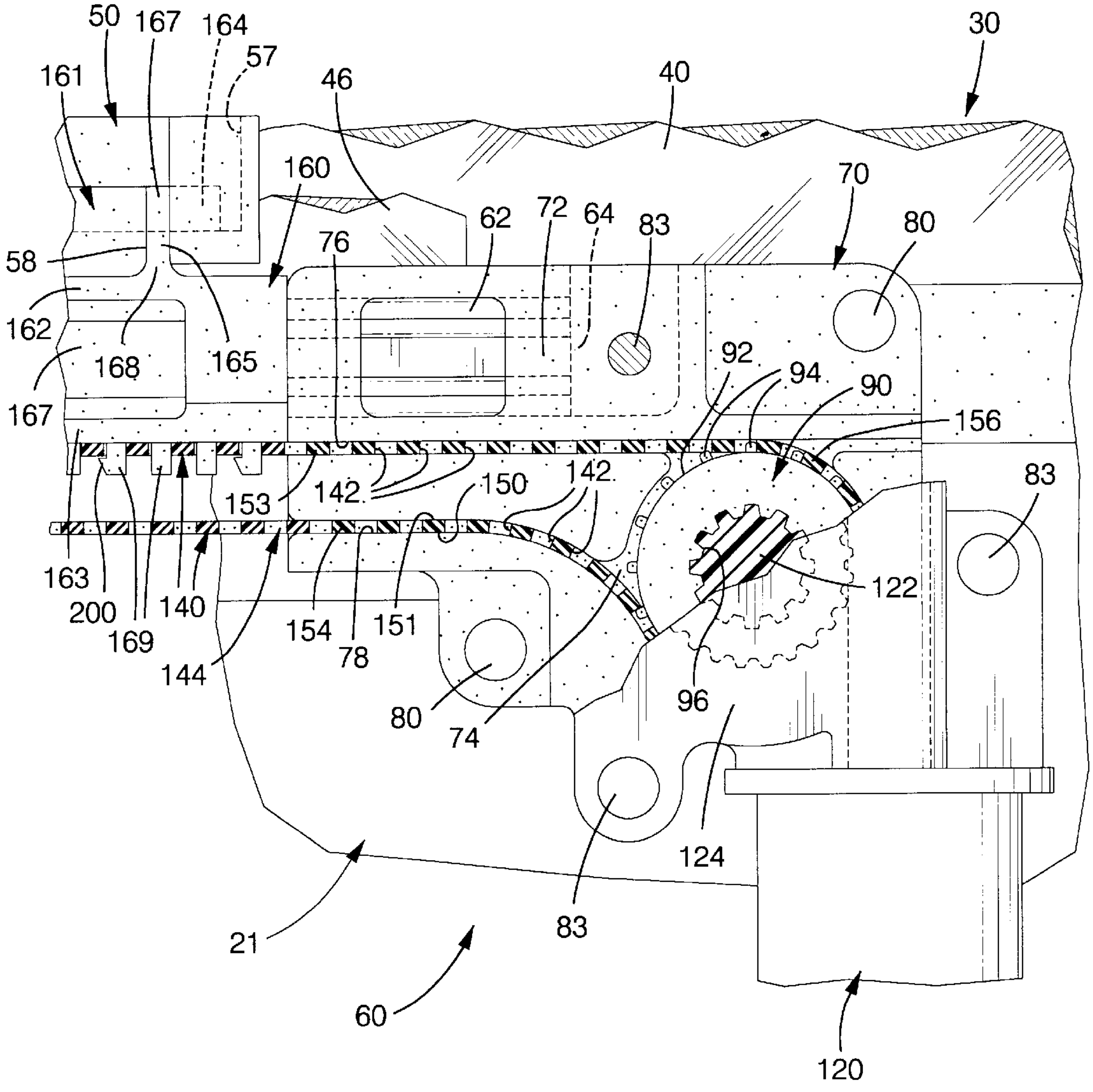
FIG. 10 is an enlargement of the encircled portion as indicated at 10 in FIG. 3 and showing a first housing member and a partially-broken-away electric motor.

Referring to FIGS. 2, 4, 7, and 10, the laterally elongated channel member 62 is preferably formed of rolled steel and is offset longitudinally forward from the window panes 40, 42, 46, 48 when the power drive mechanism 60 is mounted to the vehicle structure 21. It will be appreciated that the amount of offset varies from vehicle to vehicle and may also vary across the lateral width of the vehicle 20. Referring to FIGS. 4 and 10, the channel member 62 is laterally disposed and preferably has a lateral length greater than the combined lateral lengths of the slidable window panes 46, 48 such that the channel member 62 laterally extends from beneath the first stationary window pane 40 to beneath the second stationary window pane 42. The channel member 62 includes a first end 64 spaced beneath the first stationary window pane 40 and an opposite second end 66 spaced beneath the second stationary window 42. The channel member 62 preferably has a generally straight, continuously extending constant hat-shaped cross-section as best shown in FIGS. 7 and 9.

Referring to FIG. 10, the first housing member 70 is preferably integrally molded from a plastic material and includes a laterally extending first channel portion 72 matably shaped for receiving the first end 64 of the channel member 62 therein by slip-fitted lateral insertion. The first housing member 70 is mounted to the vehicle structure 21 at a location beneath the first stationary window pane 40 and offset longitudinally forward from the window assembly 30. The first housing member 70 further includes a forwardly opening circular first cavity 74 formed therein for rotatably supporting the first gear 90 therein. The first gear 90 is preferably molded from a plastic material and includes an outer surface 92 having outwardly projecting first gear teeth 94 circumferentially spaced equally apart and adapted for engaging the slots 142 on the tape 140 for driving the tape 140, as described further hereinafter. The first gear includes a serrated inner surface 96.

Forwardly opening upper and lower laterally elongated first guide slots 76, 78 for guiding the tape 140 are formed in the first housing member 70 and vertically aligned beneath the channel member 62. The upper and lower first guide slots 76, 78 each have a longitudinal depth approximately equal to a width of the tape 140 for closely receiving the tape 140 therein. The upper and lower first guide slots 76, 78 each laterally extend through to the first cavity 74 of the first housing member 70. The first housing member 70 also includes apertures (not shown) for receiving first mounting fasteners 80, such as rivets, for securing the first housing member 70 to the vehicle structure 21. The first housing member 70 further includes apertures (not shown) for receiving motor fasteners 83, such as rivets, to mount the electric motor 120 to the first housing member 70.

Referring to FIGS. 4 and 5, the second housing member 100 is preferably integrally molded from a plastic material and includes a laterally extending second channel portion 102 matably shaped for receiving the second end 66 of the channel member 62 therein by slip-fitted lateral insertion. The second housing member 100 further includes a forwardly opening circular second cavity 104 formed therein for rotatably supporting the second gear 110 therein on a circular post 106. The second gear 110 is preferably integrally molded from a plastic material and includes an outer surface 112 having outwardly projecting second gear teeth 114 equally circumferentially spaced for engaging the slots 142 on the tape 140. A serrated inner surface 116 of the second gear 110 freely rotates about the circular post 106 formed in the second cavity 104. While the second gear 110 has the serrated inner surface 116 to be interchangeable with the first gear 90, the inner surface 116 could also be smooth.

Forwardly opening upper and lower laterally elongated second guide slots 107, 108 are formed in the second housing member 100 and are vertically aligned beneath the second channel portion 102. The upper and lower second guide slots 107, 108 each have a longitudinal depth approximately equal to the width of the slotted tape 140 and are sized for closely receiving the slotted tape 140 therein. The second housing member 100 also preferably includes a forwardly opening tensioner cavity 118 shaped for closely receiving a tensioner member 130 therein, described further hereinafter. The second housing member 100 includes apertures (not shown) for receiving second mounting fasteners 119 therein, such as rivets, for securing the second housing member 100 to the vehicle structure 21 at a location offset longitudinally forward of the window assembly 130. A plurality of integral tabs 109 are preferably included on a forward face 101 of the second housing member 100 for holding a housing cover 136 in position on the second housing member 100.

As best shown in FIG. 5, the tensioner member 130 is preferably integrally molded of a plastic material and is seated in the tensioner cavity 118 of the second housing member 100. The tensioner member 130 includes a lower body portion 131 and a flexible upper tongue 132 which flexibly engages and is upwardly biased against the tape 140 to maintain tension on the tape 140 and prevent slack in the tape 140 to ensure smooth movement of the slidable window panes 46 , 48 between the open and closed positions, as described further hereinafter.

Referring to FIGS. 2 and 3, the housing cover 136 is generally planar and integrally molded from a plastic material. The housing cover 136 is adapted for slip-fitted lateral insertion beneath the tabs 109 on the second housing member 100. The housing cover 136 traps the second gear 110, tensioner member 130, and slotted tape 140 within the second housing member 100 when mounted thereto.

A reversible electric motor 120 is mounted to the first housing member 70 by the plurality of motor fasteners 83, such as rivets, as best shown in FIG. 10. A serrated shaft 122 is connected to the motor 120 and extends outwardly therefrom in a rearward direction. The shaft of the motor 120 engages and is rotatively coupled to the serrated first inner surface 96 of the first gear 90. The electric motor 120 selectively rotates the first gear 90 in clockwise and counterclockwise directions. A suitable casing 124 encloses the motor 120 as best shown in FIG. 10. Attachment of the motor 120 to the first housing member 70 traps the first gear 90 and slotted tape 140 within the first housing member 140, as described further below.

Referring to FIG. 2, the length of slotted tape 140 is preferably made of a polyester elastomer, such as "DYMETROL" by Dupont or a similar material. The length of tape 140 is formed into a generally continuous tape loop 144 by snap-fitted connection of a first end 146 and a second end 148 of the tape 140 onto the connector arm 190 of the power drive mechanism 60, as described further hereinafter. The plurality of slots 142 on the tape 140 are adapted for engaging and being driven by the first gear teeth 94 on the first gear 90, thus rotatively coupling the tape loop 144 to the motor 120 for movement of the tape loop 144 in the clockwise and counterclockwise directions. The second gear teeth 114 on the second gear 110 also matably engage the slots 142 of the tape 140 such that the second gear 110 is rotatively coupled to the tape 140. As best shown in FIGS. 4 and 10, the tape loop 144 includes an outer race 150 and an inner race 151 each extending around the length of tape loop 144. The tape loop 144 further includes a laterally extending upper length 153 and a laterally extending lower length 154 being parallel to and vertically spaced apart directly below the upper length 153. The tape loop 144 further includes first and second opposing U-shaped lateral ends 156, 157 engaging the first and second gears 90, 110, respectively, and interconnecting the upper length 153 and the lower length 154 of the tape loop 144. The tape loop 144 has a tape width which is oriented perpendicular to the vertically extending window panes 40, 42, 46, 48 when the power drive mechanism 60 is mounted on the vehicle structure 21. The upper and lower lengths 153, 154 of the tape loop 144 extend parallel to and are vertically aligned beneath the channel member 62. The tape loop 144 laterally extends between the first and second housing members 70, 100 and is routed through the upper and lower first guide slots, 76, 78, around the first gear 90 in the first cavity 74, through the upper and lower second guide slots, 107, 108, around the second gear 110 in the second cavity 104, and over the tensioner member 130 in the tensioner cavity 118, as best shown in FIG. 10. Advantageously, the assembled tape loop 144 is tightly drawn around the first and second gears 90, 110 and thus is constantly maintained in tension such that the tape loop 144 holds together the power drive mechanism 60 as a single assembly prior to attachment to the vehicle structure 21 and enables smooth pull/pull operation of the window assembly 130, as described further hereinafter.

Referring to FIGS. 2 and 3, the first and second upper connector arms 160, 170 operatively connect the upper length 153 of the tape loop 144 to the first slidable window pane 46 and the first and second lower connector arms 180, 190 operatively connect the lower length 154 of tape loop 144 to the second slidable window pane 48. It is essential that at least two connector arms 160, 170, 180, 190 are connected to each of the first and second slidable window panes 46, 48 to enable pull/pull movement of the window assembly 130 between the open and closed positions, as described further hereinafter. The first and second upper connector arms 160, 170 preferably are interchangeable and the first and second lower connector arms 180, 190 are preferably interchangeable.

Figure 11:
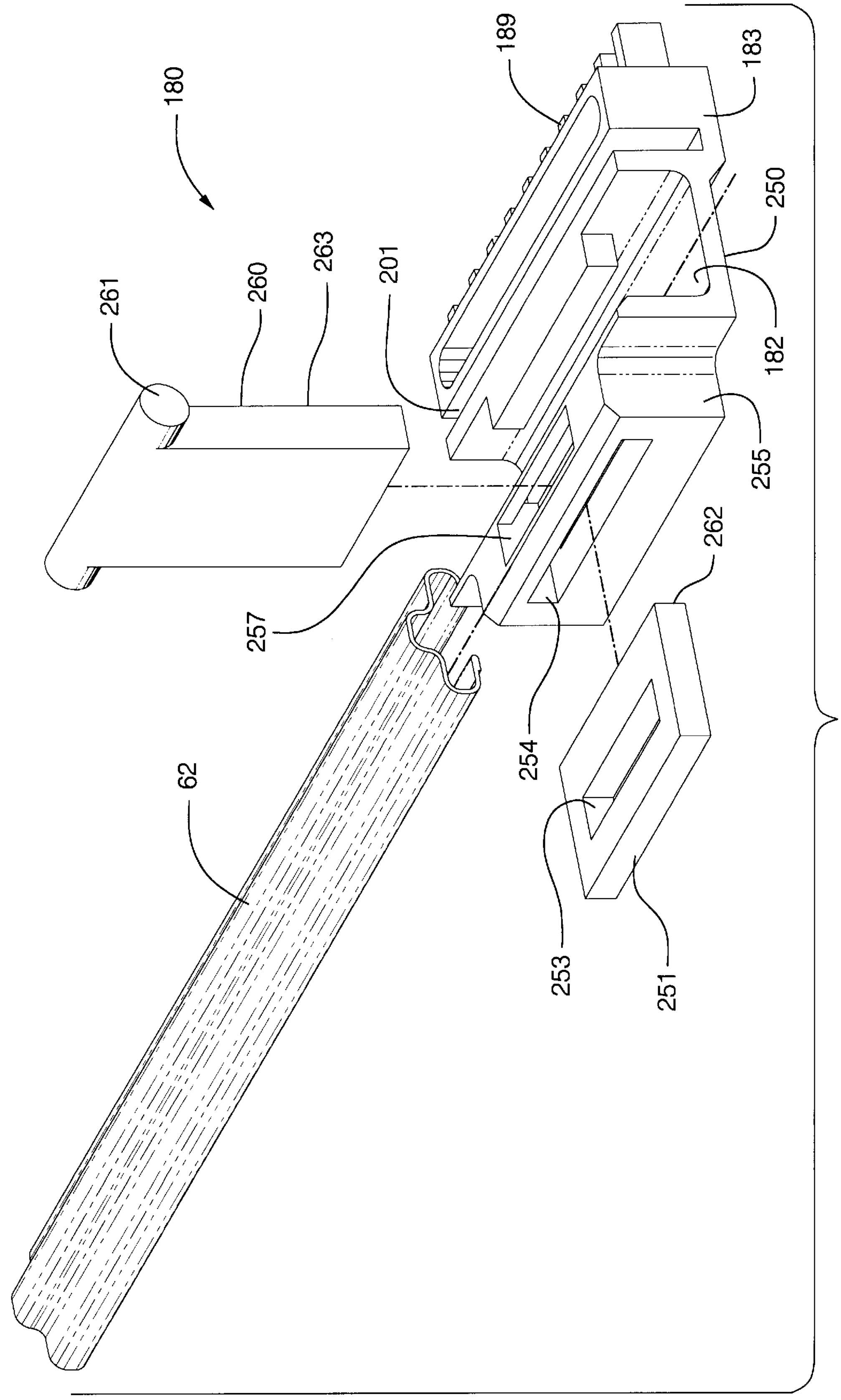
FIG. 11 is an exploded perspective view of a connector arm and channel member.

In accordance with the present invention, the upper and lower connector arms 160, 170, 180 , 190 advantageously allow both pivotal and longitudinal dimensional variations between the power drive mechanism 60 mounted on the vehicle structure 21 and the window assembly 30. This connection system with two degrees of freedom is advantageous over the prior art since the same power drive mechanism 60 and connector arms 160, 170, 180, 190 can be used on a variety of vehicles with different longitudinal offsets between window assembly 30 and the vehicle structure 21 on which the power drive mechanism 60 is mounted. As best shown in FIG. 11, each of the connector arms 160, 170, 180, 190 is made from three separately formed components. The connector arms, for example such as 180 shown in FIG. 11, each include a main connector body portion 250, a connector plate 251, and a locking plate 260 having a rod portion 261. Each of these connector arm components are preferably separately molded from a plastic material, although other materials may also be used. The first and second upper connector arms 160, 170 are each operatively connected to opposite lateral sides of the first slidable window pane 46 near the lower edge 38 of the window opening 22 and the first and second lower connector arms 180, 190 are each operatively connected to opposite lateral sides of the second slidable window pane 48 near the lower edge 30 of the window opening 22.

As best shown in FIGS. 6, 7, 8, and 9, the upper and lower connector arms 160, 170, 180, 190 each include the locking plate 260 with the rod portion 261 which is pivotally connected to respective mounting brackets 150 and slidably connected to the body portion 250 for both vertical and longitudinal movement relative to the body portion 250, as described further hereinafter. It will be appreciated that an upper portion 255 of the each of the connector arms 160, 170, 180, 190 includes a vertically extending body slot 254 and a longitudinally extending body slot 257. It will also be appreciated that the body slots 254, 257 intersect each other and are generally at right angles to each other. The body portion 250 also includes a central grooved portion 182 for slidably engaging the channel member 62 therein, and a lower end portion 183 adapted for engagement with the slots 142 on the tape loop 144. The central grooved portion 182 is sized large enough for either rotatably from the front receiving the channel member 62 therein when the connector plate 251 and locking plate 260 are removed, as described further hereinafter.

Each of the locking plates 250 includes a neck portion 263 which is narrower than the rod portion 261 and has a lateral dimension sized for closely extending through the U-shaped forward opening 58 of the upwardly opening pockets 57 in the mounting brackets 50 such that the mounting brackets 50 are laterally coupled to the connector arms 160, 170, 180, 190 for lateral movement in unison therewith. In addition, the neck portion 263 is also sized for being closely received and slidably connected within the longitudinal body slot 257 and the connector slot 253 of the connector plate 251, described below. Advantageously, the neck portion 263 of the locking plate 260 is longitudinally slidable relative to the body portion 250 to accommodate different vehicle designs.

Figure 12:
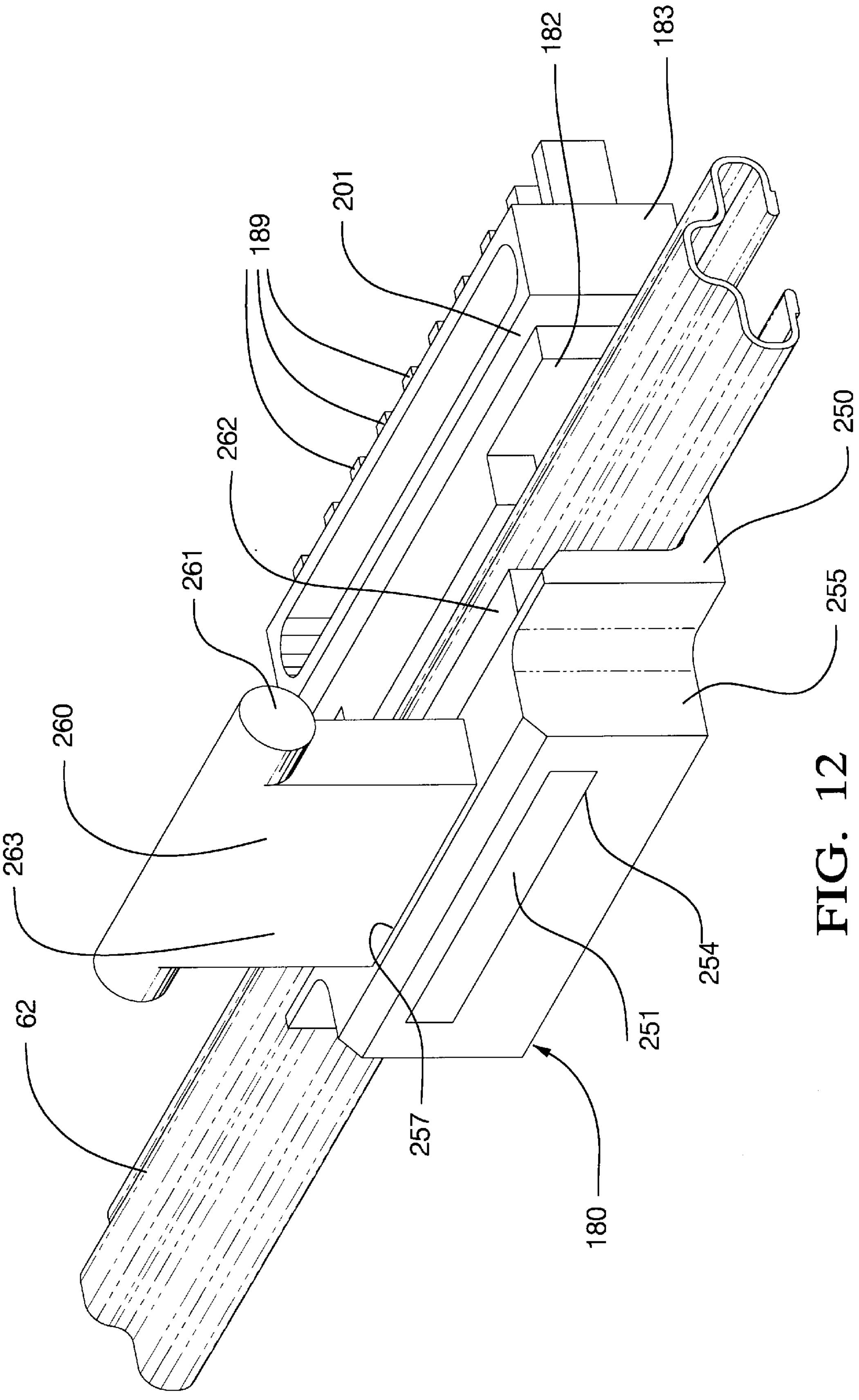
FIG. 12 is an assembled perspective view of a connector arm and the channel member.

The connector arms 160, 170, 180, 190 each further include a connector plate 251 which is preferably formed as a generally planar rectangle. As best shown in FIGS. 11 and 12, the connector plate 251 includes a connector slot 253 which may be slightly vertically offset such that the connector slot 253 is alignable with the longitudinal body slot 257 when the connector plate 251 is inserted through the vertical body slot 254 and when the bottom edge 262 of the connector plate 251 rests against the channel member 62 and locks the channel member 62 to the body portion 250, particularly when the locking plate 260 is assembled to lock the connector plate 251 in its vertical position.

As best shown in FIGS. 6–9, the rod portions 261 of the locking plates 260 are seated in the pockets 57 of the mounting brackets 50 and are vertically slidable relative to the mounting brackets 50. Each of the rod portions 261 are adapted for pivotal rotation about a laterally extending pivot axis A of the rod portions 261 such that the connector arms 160, 170, 180, 190 are vertically slidable relative the mounting brackets 50 and pivotally connected thereto to provide a vertically adjustable and pivotal attachment between the window assembly 130 and the power drive mechanism 60.

The grooved portions 182 of the connector arms 160, 170, 180, 190 are shaped for rotatably receiving the channel member 62 therein from the front such that the connector arms 160, 170, 180, 190 are slidably connected to the channel member 62 when the connector plate 251 and locking plate 260 are assembled and are easily laterally slidable relative the channel member 62 when engaged therewith. The lower end portions 183 of the connector arms 160, 170, 180, 190 are aligned below the corresponding grooved portions 182. The lower end portions 183 each include vertically downwardly extending teeth 189 adapted for engaging the slots 142 in the tape 140. Preferably, teeth 189 on each of the connector arms 160, 170, 180, 190 selectively include undercut barbed portions 200 for trapping the tape 140 on the teeth 189.

In addition to the components of the connector arms 160, 170, 180, 190 described above, the lower connector arms 180, 190 each include a laterally extending pass slot 201 interposed between the grooved portions 182 and the lower end portions 183. The pass slots 201 extend entirely through the lower connector arms 180, 190 and are sized for slidably engaging the upper length 153 of the tape loop 144 therein such that the pass slots 201 provide guidance and support for the upper length 153 of the tape loop 144. Advantageously, the laterally extending pass slots 201 permit the tape loop 144 to be vertically arranged such that the upper length 153 of the tape loop is positioned directly above and parallel to the lower length 154 such that the width of the tape is oriented normal to the vertically extending window panes 40, 42, 46, 48. Thus, the lower connector arms 180, 190 are advantageously engageable with the lower length 154 of the tape loop 144 to pull open and closed the second slidable window pane 48, without interfering with the movement of the upper length 153 of the tape loop 154 as enabled by the pass slots 201. Advantageously, the vertically aligned tape loop 144 arrangement permits the power drive mechanism 60 to be packaged in a longitudinally narrow space, such as behind a seat or in a wall of a vehicle 20.

If desired, a central support arm 210 may be mounted to the vehicle structure 21 as best shown in FIGS. 2 and 3. When using the power drive mechanism 60 with a laterally wide window assembly 30, the tape 140 may be routed through pass slits 212 in the central support arm 210 to assist with guidance and support of the tape loop 144. The central support arm 210 preferably includes a grooved portion 214 through which the channel member 62 extends and is supported. In addition, the power drive mechanism 60 may include a molded plastic trim cover 61, best shown in phantom lines in FIGS. 1, 7 and 9, which may be used to cover the entire power drive mechanism 60 from view and mounted to the vehicle structure 21 after mounting the power drive mechanism 60.

The power window assembly 24 is cooperatively provided by connection of the window assembly 30 and the power drive mechanism 60 which are each separately and independently assembled apart from the vehicle 20. The power window assembly 24 is provided by mounting the window assembly 30 to the vehicle 20, connecting the power drive mechanism 60 to the window assembly 30, and mounting the power drive mechanism 60 to the vehicle 20.

As best shown in FIGS. 7 and 9, the window assembly 30 is preferably assembled as follows. The first and second stationary window panes 40, 42 are conventionally mounted in the outboard channel 36 of the standard frame 32 and the first and second slidable window panes 46, 48 are conventionally mounted in the inboard channel 34 of the standard frame 32. Next, two mounting brackets 50 are fixedly attached to the first slidable window pane 46 and two mounting brackets 50 are fixedly attached to the second slidable window pane 48. More specifically, the rear faces 52 of the mounting brackets 50 being the metal inserts 54 are each preferably adhesively bonded to the corresponding slidable window panes 46, 48 as best illustrated in FIGS. 7 and 9. The metal inserts 54 are preferred for over plastic due to their superior bonding properties. The placement of the mounting brackets 50 on the slidable window panes may be assisted by an alignment template (not shown). Thus, the manually operable window assembly 30 including the window panes 40, 42, 46, 48 and frame 32 as originally provided with the vehicle 20 is advantageously the same window assembly 30 used for the power window assembly 24 with the simple addition of the mounting brackets 50.

While numerous variations are possible, the power drive mechanism 60 is preferably is assembled as follows. Preferably the first gear 90 is dropped rearwardly into the first cavity 74 of the first housing member 0 and is rotatably supported therein. Next, the serrated shaft 122 of the motor 120 is matably aligned with the serrated inner surface 96 of the first gear 90 and pushed rearwardly therein and the motor 120 and casing 124 is secured to the first housing member 70 by the motor fasteners 83, such as rivets. The motor 120 acts as a cover which traps the first gear 90 in the first cavity 74.

With reference to FIGS. 11 and 12, the three components of the connector arms 160, 170, 180, 190 are assembled as will now be described with respect to connector arm 180, by way of example. First, the connector plate 251 is vertically aligned with the vertical body slot 254 and is slidably inserted therein such that the connector slot 253 is longitudinally aligned with the longitudinal body slot 257 to provide a longitudinal passage. Next, the neck portion 263 of the locking plate 260 is longitudinally, slidably inserted through both the connector slot 253 and the longitudinal body slot 257. It will be appreciated that in the assembled condition, the neck portion 263 of the locking plate 260 is longitudinally adjustable relative to the body portion 250 and the connector plate 251. It will further be appreciated that the insertion of the locking plate 260 through the connector slot 253 locks the vertical position of the connector plate 251 in the assembly. Advantageously, it will also be appreciated that the connector arms 160, 170, 180, 190 can be assembled prior to attachment to the channel member 62 of after completion of the rest of the power drive mechanism 60, described below.

Next, the body portions 250 of the first and second upper connector arms 160, 170, the optional central support arm 210, and body portions 250 of the first and second lower connector arms 180, 190 are each pushed onto the channel member 62 and approximately spaced as shown in FIG. 2. Thus, the channel member 62 is successively slip-fittedly inserted through the grooved portions 182 of the first and second upper connector arms 160, 170, and the first and second lower connector arms 170, 180, respectively, such that the connector arms 160, 170 180, 190 are laterally slidable relative the channel member 62. Next, the first and second housing members 70, 100 are pushed onto the first and second ends 64, 66 of the channel member 62, respectively. Thus, the channel member 62 now laterally extends between and connects the first housing member 70 and the second housing member 100.

The length of tape 140 is preferably previously cut to the appropriate length being slightly greater than twice the lateral length of the channel member 62. Preferably, the second end 148 of the tape 140 is pushed into the lower first guide slot 78 on the first housing member 70 such that the slots 142 near the second end 148 of the tape 140 engage the first gear teeth 94 on the first gear 90. Next, power is supplied to the motor 120 such that the motor 120 rotates the first gear 90 in the counterclockwise direction. The first gear teeth 94 on the first gear 90 successively engage the slots 142 on the tape 140 and thread the tape 140 around the first gear 90 and out through the upper first guide slot 76 in the first housing member 70. The rotating motor 120 continues to feed the tape 140 in the leftwardly direction past the first and second upper connector arms 160, 170. The second end 148 of the tape 140 is then successively threaded through the pass slots 212, 201 on the central support arm 210 and second and first lower connector arms 180. 190.

Figure 6:
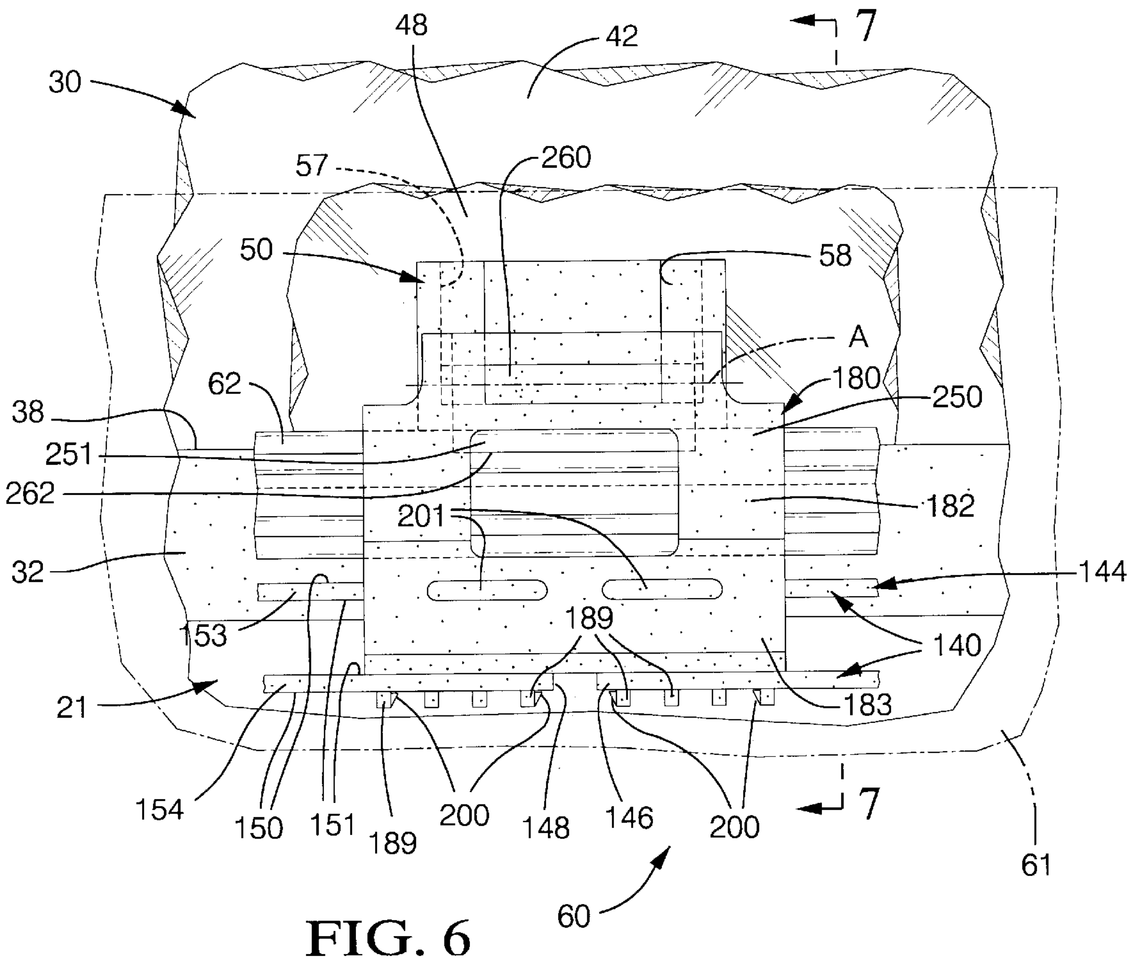
FIG. 6 is an enlargement of the encircled portion as indicated at 6 in FIG. 3 and showing a lower connector arm.

Next, the second gear 110 is pushed rearwardly into the second cavity 104 on the second housing member 100 and is freely rotatably supported therein by the circular post 106. The second end 148 of the tape 140 continues to be fed leftwardly by the first gear 90 and is then inserted through the upper second guide slot 107 of the second housing member 100 and threaded around the second gear 110 such that the tape 140 engages the second gear teeth 114 on the second gear 110. The tape 140 continues to be fed around the second gear 110 and out through the lower second guide slot 108 of the second housing member 100 until the second end 148 of the tape 140 is aligned approximately beneath the left half of the first lower connector arm 180. Next, the first end 146 of the tape 140 is threaded through the lower pass slot 201 on the central support arm 210 and the first end 146 of the tape 140 is aligned beneath the right side of the first lower connector arm 180. As best shown in FIG. 6, the slots 142 on the first end 146 of the tape 140 are snapped onto the corresponding downwardly depending teeth 189 on the right side of the first lower connector arm 180 and the slots 142 on the second end 148 of the tape 140 are snapped onto the downwardly depending teeth 189 on the left side of the first lower connector arm 180. The barbed portions 200 on the downwardly depending teeth 189 prevent release of the tape 140 from the first lower connector arm 180. Thus, attachment of the first and second ends 146, 148 of the tape 140 to the first lower connector arm 180 forms the tape 140 into a generally continuous tape loop 144. Thus, the upper length 153 of the tape 140 is positioned directly vertically above the lower length 155 of the tape 140 and first and second opposite lateral ends 156, 157 of the tape engage the first and second gears 90, 110, respectively. It will be appreciated that in the assembled condition the tape 140 is taught and continually in tension.

Next, the tensioner member 130 is pushed rearwardly into the tensioner cavity 118 on the second housing member 100 such that lower length 154 of tape 140 is now routed over the tongue 132 of the tensioner member 130. The tongue 132 of the tensioner member 130 is upwardly biased against the outer race 150 of the lower length 154 of the tape 140 and removes any slight amount of slack that may be present in the tape 140 after assembly to the first and second housing members 70, 100. At this time the housing cover 136 is assembled to the second housing member 100 simply by slip-fitted insertion in a rightwardly direction beneath the tabs 109 on the second housing member 100. When the housing cover 136 is assembled to the second housing member 100, the housing cover 136 traps the tensioner member 130 in the tensioner cavity 118, traps the second gear 110 in the second cavity 104 and traps the slotted tape 140 in the upper and lower second guide slots 107, 108. It will further be appreciated that the motor 120 and motor casing 124 serve a similar function on the first housing member 70 by trapping the first gear 90 in the first cavity 74 and by trapping the tape 140 in the upper and lower first guide slots 76, 78.

Next, a fixture or template may be used to laterally align the body portions 250 of the connector arms 160, 170, 180, 190 on the channel member 62 in position corresponding to the closed position of the window assembly 130 as shown in FIG. 2. Assembly of the power drive mechanism 60 is completed by snapping the lower end portions 163, 173 of the upper connector arms 160, 170 onto the outer race 150 of the upper length 153 of the tape loop 140 and snapping the lower end portion 93 of the second lower connector arm 190 onto the inner race 151 of the lower length 154 of the tape loop 144.

Thus, it will be appreciated that the finally assembled tape loop 144 securely connects the components of the power drive 60 together such that the power drive mechanism 60 is sufficiently sturdy to transport to the vehicle 20 assembly location. It will further be appreciated that the power drive mechanism 60 is assembled as a completely separate and independent unit from the window assembly 30.

The power window assembly 24 is completed at the vehicle assembly location or as an after-market attachment as follows. The window assembly 30 is installed in the window opening 22 of the vehicle 20 in a suitable manner as is well-known in the art. Next, the rod portions 261 of the locking plates 260 of the connector arms 160, 170, 180, 190 are each aligned above the respective mounting brackets 150 on the window assembly 30. Advantageously, the locking plates 260 may be longitudinally adjusted relative to the body portions 250 such that the rod portions 261 can be aligned with the mounting brackets 150. The rod portions 261 are slip-fittedly inserted into the pockets 57 of the mounting brackets 50 such that the rod portions 261 are seated in the pockets 57 and the neck portions 263 of the locking plates 260 extend longitudinally out through the forward openings 58 of the pockets 57. The rod portions 261 of the connector arms 160, 170, 180, 190 are each vertically slidable relative the mounting brackets 50 and are pivotally connected to the mounting brackets 50 for pivotal movement about laterally extending pivot axes A. Thus, the entire power drive mechanism 60 is now suspended from the window assembly 30 by the connector arms 160, 170, 180, 190.

It will be appreciated that since the connector arms 160, 170, 180, 190 are pivotally connected to the slidable window panes 46, 48 and are both vertically and longitudinally slidable relative thereto, the entire power drive mechanism 60 may be longitudinally and vertically adjusted for easily aligning the mounting apertures (not shown) in the first and second housing members 70, 100 with mounting holes (not shown) provided on the vehicle structure 21. Thus, any dimensional variations between the power drive mechanism 60 and the vehicle 20 for various vehicles designs are accommodated by the adjustable connection between the power drive mechanism 60 and the window assembly 30 provided by the three piece connector arms 160, 170, 180, 190. Next, the first and second mounting fasteners, 80, 119, such as rivets, are driven through the first and second housing members, 70, 100, respectively, to mount the power drive mechanism 60 to the vehicle structure 21. Connection of the first and second housing members 70, 100 to the vehicle structure 21 in combination with the tension on the tape loop 144 now prevents inadvertent vertical upward removal of the connector arms 160, 170, 180, 190 from the mounting brackets 150.

Advantageously, the power drive mechanism 60 has absolutely no connection to the frame 32 of the window assembly 30 and is assembled as a unit completely independent and separate from the window assembly 30. It will be appreciated that the connector arms 160, 170, 180, 190 provide an adjustable vertically and longitudinally floating connection between the channel member 62 and the slidable window panes 46, 48 to enable easy alignment of the power drive mechanism 60 relative the vehicle 20 and window assembly 30 in the vertical and longitudinal directions as enabled by the rod portions 261 in the pockets 57 and the longitudinally slidable locking plates 260.

Referring to FIGS. 2 and 3, the power window assembly 60 pulls open and pulls closed the first and second slidable window panes 46, 48 as follows. To open the movable window panes 46, 48 , the operator pushes a switch in the cab, not shown, which is connected to the reversible electric motor 120 and the electric motor 120 drives the first gear 90 in a clockwise direction. The first gear 90 which is engaging the tape 140 pulls the upper length 153 of the tape loop 144 away from the first slidable window pane 46. The teeth 179 extending from the first upper connector arm 170 and engaging the tape 140 causes the laterally coupled respective mounting bracket 150 to slide to the right and to pull the first movable window pane 46 from the closed position shown in FIG. 2 to the open position shown in FIG. 3. Simultaneously, the second gear 110 is rotated in a clockwise direction by the pulling of the upper length 153 of the tape loop 144 engaged with the second gear 110. The second gear 110 and upper length 153 of tape 140 cooperatively pull the lower length 154 of the tape 140 away from the second window slidable window pane 48. The teeth 199 extending from the second lower connector arm 190 and engaging the lower length 154 of the tape loop 140 causes the laterally coupled mounting brackets 150 on the second slidable window pane 48 to slide to the left and to pull the second d slidable window pane 48 from the closed position shown in FIG. 2 to the open position shown in FIG. 3. When the first and second slidable windowpanes 46, 48 simultaneously arrive at the fully open position shown in FIG. 2, the first upper connector arm 160 and second lower connector arm 190 engage the first and second housing members 70, 100, respectively, and prevent further rotation of the motor 120 which then stalls and switches off. Optionally, an operator could switch off the motor 120 by the cab switch to partially open the window assembly 30.

To close the movable window panes 46, 48, the operator presses a switch in the cab (not shown). Referring to FIG. 3, the shaft 122 of the motor 120 drives the first gear 90 in a counterclockwise direction. The first gear 90, which is engaging the tape, 140 pulls the lower length 154 of the tape loop 144 rightwardly and away from the second slidable window pane 48. The teeth 189 of the first lower connector arm 180 engaging the lower length 154 of the tape loop 144 cause the laterally coupled corresponding mounting brackets 150 to slide to the right thereby pulling the second slidable window pane 48 from the open position shown in FIG. 2 to the closed position shown in FIG. 2. Simultaneously, the second gear 110 is rotated in the counterclockwise direction by the pulling movement of the lower length 154 of the tape loop 144 in the rightwardly direction. The second gear 110 and lower tape length 154 cooperatively pull the upper length 153 of the tape loop 144 to the left and away from the first slidable window pane 46. The teeth 179 of the second upper connector arm 170 engaging the slotted tape 140 causes the laterally coupled corresponding mounting brackets 150 to slide to the left and to pull the first slidable window pane 46 from the open position shown in FIG. 3 to the closed position shown in FIG. 2. When the second upper connector arm 170 and the first lower connector arm 180 engage the central support arm 210 as shown in FIG. 2, further rotation of the motor 120 is prevent and the motor 120 stalls and turns off.

It will be appreciated that the present invention provides a power drive mechanism 60 which has a greatly reduced number of fasteners over the prior art. The entire power drive mechanism 60 snap-fits or slip-fits together, with the only exception of three fasteners 83 for connection of the electric motor 120 to the first housing member 70.

Advantageously, it will be appreciated that the connector arms 160, 170, 180, 190 may be serviced and removed from the power drive mechanism 60 without any other disassembly of the power drive mechanism 60 required. To disassemble the connector arms 160, 170, 180 or 190, the rod portion 261 is manually forced upwardly so that it disengages from the mounting brackets 50. Next, the locking plate 260 is pulled in a longitudinal direction out of the longitudinal body slot 257 and the connector slot 253 such that it is free from the connector arm assembly. Next, the connector plate 251 is lifted through the vertical body slot 254 and is removed from the body portion 250. Finally, the body portion 250 can be rotated about the lateral axis of the channel member 62 and taken off the channel member 62 at whichever location it happens to be when servicing is required. It will be appreciated that the body portion 250 can be easily removed since the grooved portion 182 is large enough for insertion and removal of the channel member 62 without the bottom edge 262 of the connector plate 251 engaging the channel member 62 and without the locking plate 260 locking the connector plate 251 in its vertical position.

It will be understood that a person skilled in the art may make modifications to the embodiments shown herein within the scope and intent of the claims. Advantageously, the width of the entire power drive mechanism 60 may be easily modified to use with any lateral length of window assembly 30 simply by changing the lateral length of the channel member 62 and the tape 140 without otherwise modifying any of the other components. It will further be appreciated that the power drive mechanism 60 can be used for powered operation of any laterally slidable window panes within any type of vehicle simply by connecting or disconnecting the connector arms 160, 170, 180, 190 as easily enabled by the three piece construction. Thus, the power drive mechanism 60 is also easily adapted for use with a single movable window pane, by removing two of the connector arms.

While the present invention has been described as carried out in a specific embodiment thereof, it is not intended to be limited thereby but is intended to cover the invention broadly within the scope and spirit of the appended claims.

What is claimed is:

1. A power window assembly in a vehicle comprising:

a slidable window pane mounted to the vehicle for movement in a first lateral direction to an open position and in a second lateral direction to a closed position;

at least one mounting bracket securely attached to the window pane and having a pocket therein; and a power drive mechanism for selectively moving the window pane between the closed position and the open position; and at least one connector arm being laterally coupled to the mounting bracket, the connector arm including a locking plate and a body portion, the body portion having a longitudinally extending body slot, and the locking plate being longitudinally inserted into the longitudinal body slot to adjustably connect the window pane to the power drive mechanism;

whereby the locking plate of the connector arm is free to longitudinally float relative to the window pane and the body portion during movement of the window pane between the open position and the closed position.

2. The power window assembly of claim 1 wherein the body portion includes a vertically extending body slot which is perpendicular to and intersects the longitudinally extending body slot and wherein the connector arm includes a connector plate having a connector slot therein which is vertically aligned with the longitudinally extending body slot.

3. The power window assembly of claim 2 wherein the locking plate includes a neck portion sized for longitudinal slidable insertion into both the connector slot and the longitudinally extending body slot and wherein the locking plate engages the connector plate and maintains the connector plate in a vertical position relative to the body portion.

4. The power window assembly of claim 2 wherein the power drive mechanism includes a laterally extending channel member and wherein the body portion includes a grooved portion sized for slidably receiving the channel member therein and wherein the connector plate includes a bottom edge that engages the channel member and locks the channel member to the body portion when the connector plate is inserted through the vertically extending body slot.

5. The power window assembly of claim 4 wherein the insertion of the locking plate into the connector slot vertically locks the connector plate in position for maintaining engagement with the channel member.

6. The power window assembly of claim 1 wherein the locking plate includes a rod portion seated in the pocket of the mounting bracket by slip-fitted insertion therein and being vertically slidable relative the pocket to adjustably connect the window pane to the power drive mechanism such that the connector arm of the power drive mechanism both vertically and longitudinally float relative to the window pane during movement of the window pane between the open position and the closed position.

7. A connector arm and a laterally extending channel member for connecting a power drive mechanism to a window assembly, the connector arm comprising:

a body portion having a grooved portion slidably receiving the channel member therein, the body portion including a longitudinally extending body slot and a vertically extending body slot which intersect each other generally at right angles;

a connector plate having a connector slot, the connector plate slidably insertable through the vertically extending body slot such that the connector slot is vertically aligned with the longitudinally extending body slot and slidably connecting said connector arm on said channel member; and a locking plate slidably insertable through the connector slot and the longitudinally extending body slot such that the locking plate is longitudinally adjustable relative to the body portion.

8. The connector arm of claim 7 wherein the connector plate has a bottom edge which engages with the channel member to hold the channel member in the grooved portion and wherein the locking plate locks the connector plate in engagement with the channel member.

9. The connector arm of claim 7 wherein the locking plate includes a neck portion and a rod portion, the rod portion for attachment to to the window assembly and wherein the neck portion of the locking plate is longitudinally adjustable relative to the body portion.

10. The connector arm of claim 7 wherein the body portion, the locking plate, and the connector plate are each separately formed.

11. The connector arm of claim 7 wherein the body portion, the locking plate and the connector plate are each separately molded of a plastic material.

* * * * *